United States Patent
Kennard, IV

(10) Patent No.: US 7,267,318 B2
(45) Date of Patent: Sep. 11, 2007

(54) VIBRATION CONTROL DEVICE

(75) Inventor: Samuel M. Kennard, IV, Clayton, MO (US)

(73) Assignee: Kennard Industries, Incorporated, St. Louis, MO (US)

( * ) Notice: Subject to any disclaimer, the term of this patent is extended or adjusted under 35 U.S.C. 154(b) by 67 days.

(21) Appl. No.: 10/907,462

(22) Filed: Apr. 1, 2005

(65) Prior Publication Data
US 2005/0224684 A1 Oct. 13, 2005

Related U.S. Application Data

(60) Provisional application No. 60/521,360, filed on Apr. 8, 2004.

(51) Int. Cl.
*F16M 13/00* (2006.01)
(52) U.S. Cl. ...................................... 248/562; 248/917
(58) Field of Classification Search ................ 248/562, 248/580, 615, 917; 193/37
See application file for complete search history.

(56) References Cited

U.S. PATENT DOCUMENTS

| | | | | |
|---|---|---|---|---|
| 4,784,194 A * | 11/1988 | Danner | ..................... | 144/286.1 |
| 5,409,265 A * | 4/1995 | Douglass | .................... | 280/843 |
| 5,435,411 A * | 7/1995 | Borgatti | ................... | 182/181.1 |
| 5,533,604 A * | 7/1996 | Brierton | ............... | 193/35 MD |
| D412,106 S | 7/1999 | Kennard, IV | | |
| 6,357,717 B1 | 3/2002 | Kennard, IV | | |
| 6,655,668 B1 | 12/2003 | Wakeen et al. | | |
| 6,729,460 B2* | 5/2004 | Esser et al. | ............. | 193/35 TE |
| 6,814,212 B1* | 11/2004 | Ebersole | ................... | 193/35 R |
| 2005/0187498 A1* | 8/2005 | Miller | ......................... | 601/72 |

* cited by examiner

*Primary Examiner*—Amy J. Sterling
(74) *Attorney, Agent, or Firm*—Blackwell Sanders LLP; Mark E. Stallion

(57) ABSTRACT

A device for control of the effects of vibrations on vibration sensitive equipment when a plurality of the devices are placed on a support surface and in operative contact with the vibration sensitive equipment where said device is a unitary piece of a soft, pliable substance having a hardened round crown portion.

6 Claims, 3 Drawing Sheets

VIBRATION CONTROL DEVICE

CROSS REFERENCES TO RELATED APPLICATIONS

This patent application claims priority to U.S. Provisional Patent Application Ser. No. 60/521,360 filed Apr. 8, 2004.

BACKGROUND OF INVENTION

1. Field of Invention

This invention relates generally to the field of vibration isolation mechanisms, more particularly, to a vibration control device which provides improved vibration control noise reduction in an economical, easy to use device which is perfectly suited, for example, for improving noise reduction, when used with audio equipment.

2. Background Art

People who spend a significant amount of time listening to music often become particularly astute to hearing extraneous variations, which can be caused by a number of factors. One of the main causes of such performance variations in such equipment is vibration, particularly that which is referred to as "micro" vibration within the audio equipment, such as compact disk ("CD") players, preamplifiers, amplifiers, phonograph stages, and turntables. Other, "macro" vibrations may also happen when a door is slammed, the equipment is bumped, or even from floor movement caused by a person walking in the room. The effects of these types of vibrations can also be reduced with the new vibration reduction devices.

The same may be said of visual effects on video equipment, such as laser disk and digital video display ("DVD") players, which become subject to similar vibrations. The irregularities in sound or visual quality of the product caused by the vibration are very distracting to the experienced observer and significantly decreases the quality of the listening or viewing experience for these individuals. Similarly high technology and laboratory equipment such as microscopes, scales, etc. may likewise be negatively affected by vibrations, even to the extent of causing data produced or collected thereon to be unreliable.

Thus, there has been a need for a product which can easily and inexpensively isolate, reduce or "buffer," the effects of vibrations on sound and video equipment or other vibration sensitive machines in order to provide improved performance, as well as to reduce wear and tear on the equipment and thus increase the useful life thereof.

Throughout this discussion, and the description and claims below, it is to be understood that references to "noise reduction equipment" and the like are meant to include sound equipment, as well as video and other sophisticated or scientific equipment which is subject to negative effects of external and internal vibrations. For simplicity of the discussion, "audio" or "sound production" equipment will often be used inclusively of any and all types of equipment, the performance of which will benefit from support of the equipment on the new noise reduction devices described below. Further, for simplicity, the new vibration control device will sometimes hereafter be referred to as "VCD" or "device."

Previously, attempts to address the above problems have included use with the performance equipment of such items as isolation cones, spikes, SORBOTHANE (registered trademark of Sorbothane, Inc.) sheets or balls, air isolation platforms, seismic "sinks," and sand boxes, in attempts to dampen the vibrations. However, each of these different methods has certain limitations or disadvantages. Some of the known methods, such as air isolation devices and some seismic sinks are quite expensive and also require a source of pressurized air. However, it is possible to use the new vibration control devices in combination with some known devices, such as seismic sinks, to control different vibration frequency ranges by two independent mechanisms used in complementary fashion.

Products made of SORBOTHANE material are limited in the capability to attenuate vibration. Spikes and cones "drain" vibration to the ground or other support surface, rather than actually isolating the performance device from the vibration; and sand boxes, by definition, include the use of sand, which can be very messy and necessarily creates the risk of inadvertent introduction of sand particles and dust into expensive performance equipment, accessories, tapes, compact disks, and anything else in the vicinity of use of the sand.

Also, the present applicant has patented a previous device, U.S. Pat. Nos. 6,357,717 and D412,106, for control of the effects of vibrations on vibration sensitive equipment when a plurality of the devices are placed on a support surface and in operative contact with the vibration sensitive equipment and the patented device is a unitary piece of a soft, pliable substance. The device has a top and a bottom and an exterior side wall extending between the top and the bottom. The exterior side wall is formed into a plurality of distinct levels between the top and the bottom, to thereby isolate vibrations which can affect the performance of the piece of vibration sensitive equipment. However, the device described in these applications are very weight sensitive, thus requiring varying classes of the device to accommodate the varying weights of the equipment. There are also patented devices such as the device shown in U.S. Pat. No. 6,655,668, which includes a plurality of bearings each in contact with an adjacent bearing and arrange in two layers and where the bearings are disposed in a retainer made of resilient material. However, the energy absorption and dispersion characteristics are not ideal due to the interaction between the hard bearings and the resilient retainer design.

SUMMARY OF INVENTION

The invention is a frustum-conical shaped device for control of the effects of vibrations on vibration sensitive equipment when a plurality of the devices are placed on a support surface and in operative contact with the vibration sensitive equipment, where the frustum-conical shaped device is a unitary piece of a soft, pliable substance having an exterior wall with outward angular transition and a substantially spherical hardened crown portion. The bottom surface of the device has a slightly raised outer edge such that the bottom surface has a slightly concave shape. The substantially spherical hardened crown portion can be a metal ball (or ball of other hardened material) recessed below the top surface of the frustum-conical solid resting in a substantially spherical cavity extending downward from the top of the solid. This ball may be changed by the end user.

With the above problems and limitations of the known art in mind, the present invention was developed with the goals of providing a vibration isolating device which is inexpensive to produce, durable, and facile to use with little or no instruction, so as to be readily accessible and usable by the anyone, including the most ardent audiophile as well as the less sophisticated user, including those with modest financial means. It is further among the advantages of the present invention that the new vibration reduction device is suitable for manufacture in a variety of sizes or models so as to be capable of handling various sizes of loads and a variety of applications, such as excess noise reduction and vibrations which can affect readings of scientific instruments. It is further the objective that the present invention be less sensitive to various weight differences in the equipment to be supported such that a given device can be used to support a wide weight range. It is further intended that the new vibration control device be used as a plurality of same and the number and relative positions of such device in relation to the object being supported thereon be readily selectively variable, to suit the user's needs or particular preferences.

It is further among the objects of the invention, having the features indicated, the new vibration control device not require a source of pressurized air to function, or any extraneous equipment, whether powered, or otherwise, and that it be light-weight and small, for facile placement where needed, that it isolate the unwanted vibration and disperse the energy throughout the device and thus isolate the equipment with which it is used from vibration, rather than simply draining the vibration to the ground.

When the new vibration control devices are used as described hereafter with audio equipment for vibration isolation, the resultant reduction of unwanted sounds ("noise"); i.e., lowering of the "noise floor" allows for greater dynamics and a perception of increased volume levels. Some users will note that the volume can actually be turned down, relative to their usual listening levels, and good enjoyment of the music still obtained.

These and other advantageous features of the present invention will be in part apparent and in part pointed out herein below:

BRIEF DESCRIPTION OF THE DRAWINGS

For a better understanding of the present invention, reference may be made to the accompanying drawings in which.

DETAILED DESCRIPTION OF INVENTION

Figure 1:
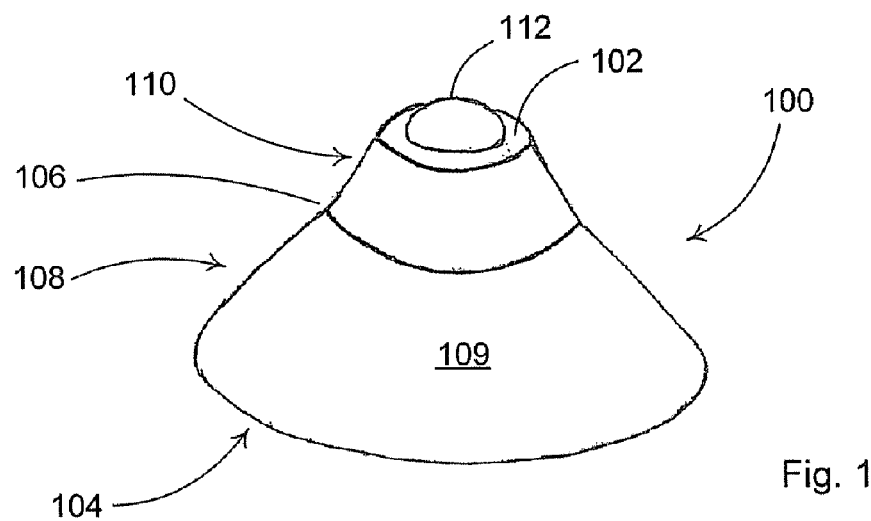
FIG. 1 is a perspective view of the present device.
Figure 2:
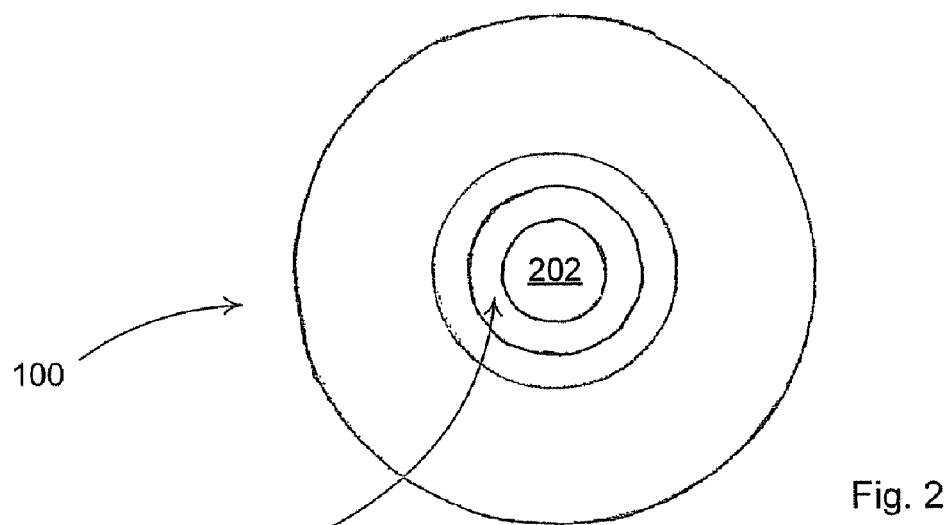
FIG. 2 is a top plane view of the present device.
Figure 3:
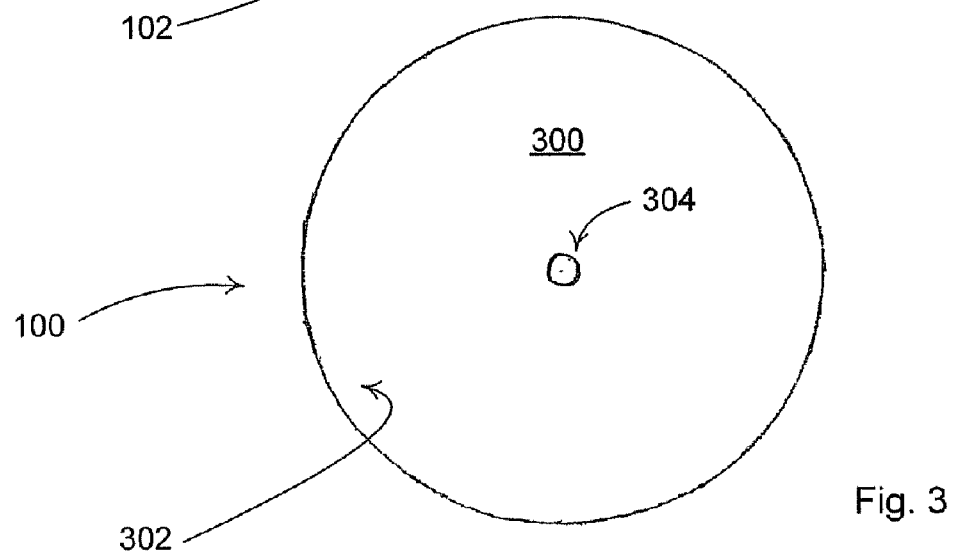
FIG. 3 is a bottom view of the present device.
Figure 4:
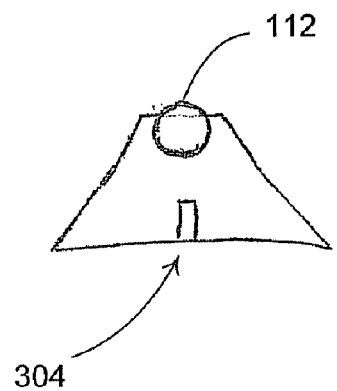
FIG. 4 is a cross sectional view of the device with the ball in place.

According to the embodiment(s) of the present invention, various views are illustrated in FIG. 1-6 and like reference numerals are being used consistently throughout to refer to like and corresponding parts of the invention for all of the various views and figures of the drawing. Also, please note that the first digit(s) of the reference number for a given item or part of the invention should correspond to the Figure number in which the item or part is first identified.

One embodiment of the present invention comprising a frustum-conical shaped unitary main body made of a pliable material having a top surface and a bottom surface and conical side walls extending from the top surface to the bottom surface and where the conical side walls are formed with a angular variation in the downward and outward slope and further where the bottom surface is formed with a slight concavity and comprising a non-pliable spherical protrusion integral with the main body and extending from the top surface teaches a novel device for controlling the effects vibration.

The details of the invention and various embodiments can be better understood by referring to the figures of the drawing. Referring to FIGS. 1-5, the present VCD 100 is shown having a frustum-conical shaped unitary main body 104 made of a pliable material having a top surface 102 and a bottom surface 300 and a conical side wall 109 extending from the top surface 102 to the bottom surface 300 and where the conical side wall 109 is formed with an angular variation in the downward and outward slope (this embodiment shows a transition in slope at 106 forming an upper portion of the side wall 110 and a lower portion of the side wall 108, where the upper portion of the side wall 110 has a steeper downward slope) and further, where the bottom surface 300 is formed with a slight concavity (see cross section in FIGS. 4 and 5) and comprising a non-pliable spherical protrusion 112 integral with the main body 104 and extending from the top surface 102 which teaches a novel device for controlling the effects of vibration.

Figure 7:
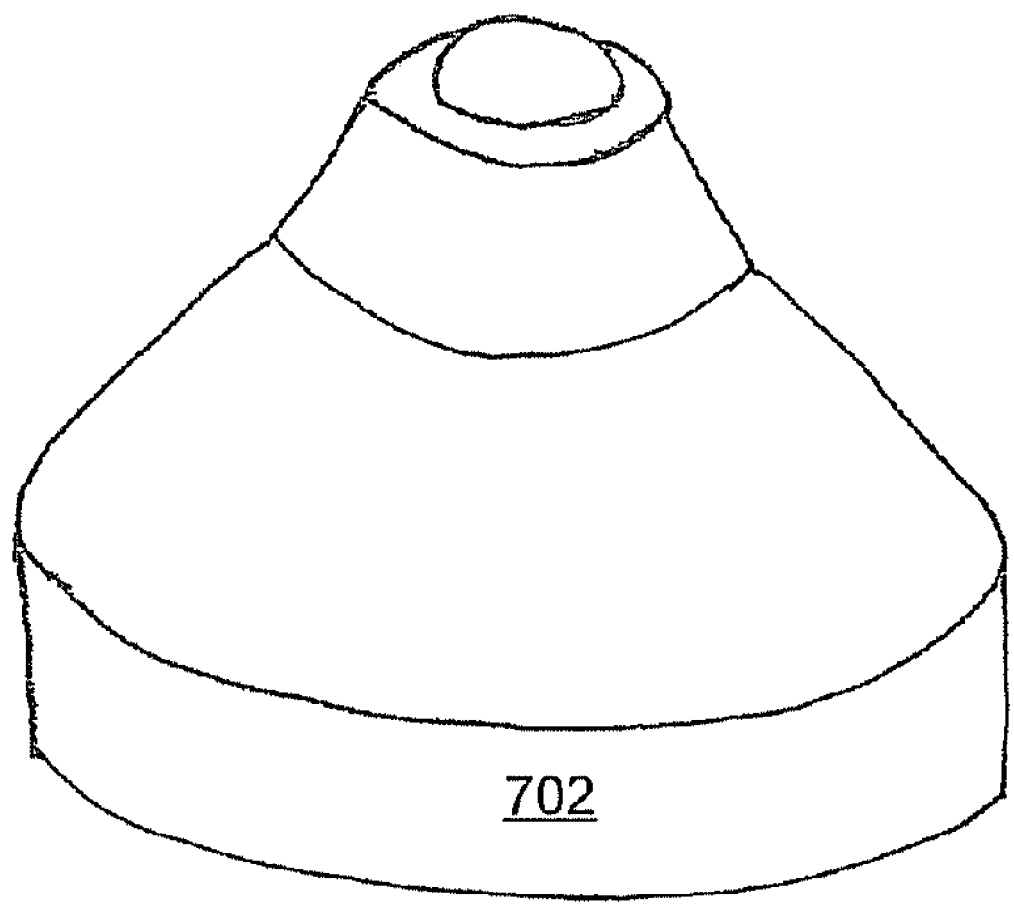
FIG. 7 is an alternative embodiment of the device.

The shock absorbing device or VCD further can have a cylindrical cavity 304 extending upward from a central portion of the bottom surface 300 into the interior of the unitary main body. The cylindrical cavity allows the otherwise solid unitary body to have a threaded rod inserted into it so as to allow the device to be attached to equipment. As indicated above, the shock absorbing device can have an angular variation in the slope to transition to an increased outward angular slope and a decreased downward slope. The side wall can have a gradual angular transition forming a curve. The device can also have a cylindrical side wall portion 702, see FIG. 7 between the lower portion 108 and the bottom 300. However the embodiment shown has two angles or slopes of the side wall forming an upper 110 and lower 108 portion of the side wall with the angular transition at 106. The double angles of the wall created by the transition has the tendency to disperse energy throughout the device.

Figure 5:
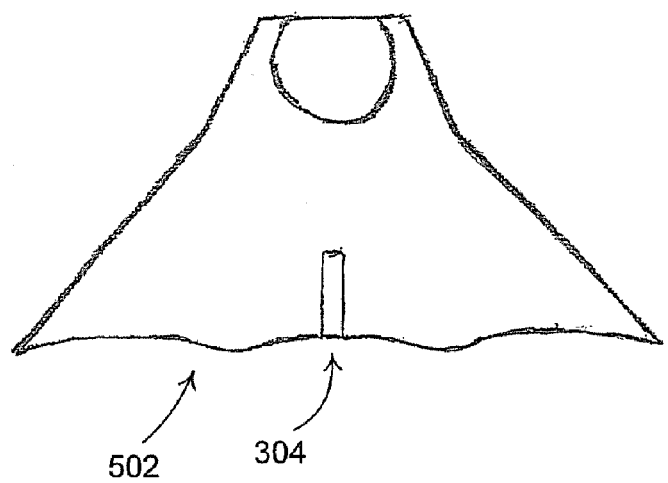
FIG. 5 is a cross sectional view of the device with the ball removed.

Also, the shock absorbing device can have a bottom surface that has an irregular concavity, see FIG. 5. The bottom of the VCD cones can have a raised outer edge such that the central portion of the bottom surface can be pushed downward from its unloaded resting position. This provides for a shock absorbing action. For one embodiment of the VCD the downward possible travel of the central portion can be about approximately 1/32". This may vary depending on the concavity of the bottom surface and the desired shock absorbing characteristics. The bottom surface may also have an irregular concavity.

The body of the cone 104 can be made of a pliable material, of possibly different densities, which will compress to conform when various weights are applied. The shock absorbing device or VCD can have a non-pliable spherical protrusion that is a non-pliable ball partially recessed below the top surface and into a cavity of the main body having a top crown portion of the ball extending from and above the top surface. The spherical protrusion or exposed crown of the ball can act as a single small point of contact, which drains energy into the unitary pliable body of the substantially frustum-conical shock absorbing device and disperse the energy throughout the device rather than dispersing energy directly to the surface supporting the VCD.

Figure 6:
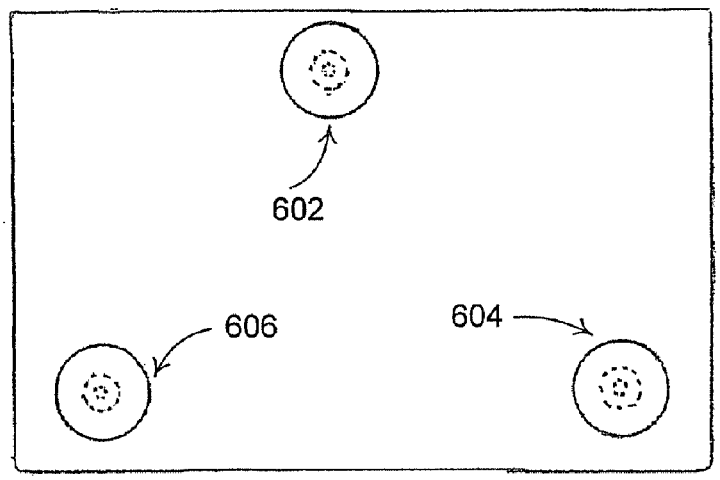
FIG. 6 is an illustration of the device with a piece of equipment supported thereby.

Referring to FIG. 6, the shock absorbing devices can be arranged in a tri-pod arrangement 602, 604, 606 or four or more, until the desired stability is maintained for supporting the vibration sensitive equipment 600. The ability to vary the configuration of the shock absorbing devices is useful when the underside of equipment is warped or if the shelf on which it rests is warped. The spherical protrusion providing a small single point of contact with the underside of the equipment allows for ease in varying the configuration of the VCDs. The present shock absorbing device is resistant to distortion when heavy equipment rests on them. A VCD will support about approximately 25 lbs., assuming for example a VCD of the present design approximately includes dimensions having a bottom surface diameter of the unitary main body of about approximately 1 5/8 inches, a top surface diameter of about approximately 7/16 inches, a height of about approximately 5/8 inches, a ball diameter of about approximately 7/16 inches, a slope transition height of about approximately 7/16 inches, an upper portion downward slope of about approximately 60 degrees down from horizontal and lower portion of about approximately 50 degrees down from horizontal. The dimensions above are merely a representative example but may vary to accommodate the specific application without varying from the spirit and scope of the present invention.

The various shock absorbing device examples shown above illustrate novel apparatus for reducing the effect of vibrations with a device that is less sensitive to variation in weight and that provides a small single contact point with the equipment being supported. A user of the present invention may choose any of the above embodiments for the shock absorbing device, or an equivalent thereof, depending upon the desired application. In this regard, it is recognized that various forms of the subject shock absorbing invention could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A shock absorbing device comprising:
    a frustum-conical shaped unitary main body made of a pliable material having a top surface and a bottom surface and conical side walls extending from the top surface to the bottom surface and where the conical side walls are formed with an angular variation in the downward and outward slope and further where the bottom surface is formed with a slight concavity; and
    a non-pliable spherical protrusion integral with the main body and extending from the top surface.

2. The shock absorbing device as recited in claim 1, where the conical side walls include a cylindrical side wall portion.

3. The shock absorbing device as recited in claim 1, further comprising:
    a cylindrical cavity extending upward from a central portion of the bottom surface into the unitary main body.

4. The shock absorbing device as recited in claim 1, where the angular variation in the slope is a transition to an increased outward angular slope and a decreased downward slope.

5. The shock absorbing device as recited in claim 1, where the bottom surface has an irregular concavity.

6. The shock absorbing device as recited in claim 1, where the non-pliable spherical protrusion is a non-pliable ball partially recessed below the top surface and into a cavity of the main body having a top crown portion of the ball extending from the top surface.

* * * * *